United States Patent [19]

Lauder

[11] 4,200,554
[45] Apr. 29, 1980

[54] BARIUM- AND RUTHENIUM-CONTAINING PEROVSKITE CATALYSTS

[75] Inventor: Alan Lauder, Newark, Del.

[73] Assignee: E. I. Du Pont de Nemours & Company, Wilmington, Del.

[21] Appl. No.: 936,744

[22] Filed: Aug. 25, 1978

Related U.S. Application Data

[63] Continuation-in-part of Ser. No. 686,640, May 14, 1976, Pat. No. 4,110,258, which is a continuation of Ser. No. 463,986, Apr. 25, 1974, abandoned.

[51] Int. Cl.$^2$ .................. B01J 21/06; B01J 23/58; B01J 23/64
[52] U.S. Cl. .................................. 252/474; 423/213.5
[58] Field of Search .................. 252/474; 423/213.5, 423/593, 594

[56] References Cited

U.S. PATENT DOCUMENTS

| | | | |
|---|---|---|---|
| 3,900,428 | 8/1975 | Mai et al. | 252/462 |
| 3,905,918 | 9/1975 | Mai et al. | 252/462 |
| 3,907,968 | 9/1975 | Kobylinski et al. | 423/213.5 |

Primary Examiner—W. J. Shine
Attorney, Agent, or Firm—James A. Costello

[57] ABSTRACT

Catalytic compositions having the general formula, $ABO_3$, and a perovskite crystal structure, wherein the A sites are substantially fully occupied by barium ions. About 1% to 20% of the Type B cation sites are occupied by ions of at least one platinum group metal selected from ruthenium, osmium, rhodium, iridium, palladium and platinum, with ruthenium being present and occupying up to about 10% of the Type B cation sites. The balance of 80% to 99% of the Type B cation sites are occupied by ions of at least one metal having an atomic radius between 0.4 to 1.4 Angstroms. The compositions are useful in gaseous oxidation and reduction reactions.

10 Claims, No Drawings

BARIUM- AND RUTHENIUM-CONTAINING PEROVSKITE CATALYSTS

CROSS-REFERENCE TO RELATED APPLICATIONS

This is a continuation-in-part application of copending application Ser. No. 686,640, filed May 14, 1976, now U.S. Pat. No. 4,110,258, which was a continuation of application Ser. No. 463,986, filed Apr. 25, 1974, and now abandoned.

BACKGROUND OF THE INVENTION

Considerable effort has been expended in recent years to develop improved heterogeneous catalysts for the oxidation of volatile carbon compounds and for the reduction of nitrogen oxides to nitrogen. Such efforts have been directed not only toward the development of more effective catalysts for use in the manufacture of organic chemicals and for the reduction of atmospheric pollution by industrial processes involving the manufacture and use of nitric acid, but also toward the reduction of atmospheric pollution by exhaust gases from internal combustion engines.

Among the catalytic compositions which have been proposed for reducing the concentration of nitrogen oxides in off-gases for nitric acid plants and exhaust gases of internal combustion engines are such platinum group metals as platinum, palladium, rhodium, and ruthenium and the oxides of metals from the first transition series of the Periodic Table such as iron, cobalt, and nickel and of rare earth metals such as lanthanum, neodymium, and praseodymium. Certain catalytic compositions, including perovskites, have been proposed by Mai et al, in U.S. Pat. Nos. 3,900,428 and 3,901,828 and by Kobylinski et al, in U.S. Pat. No. 3,907,968.

Although some of the proposed catalysts are better than others, all of them have certain weaknesses. For example, the effectiveness of platinum group metals in oxidation reactions is lessened by exposure to elevated temperatures. Other proposed catalysts are effective only at high temperatures that require catalyst supports and enclosures made of materials which are scarce and difficult to fabricate. Some of the proposed catalysts for the reduction of nitrogen oxides promote the formation of undesirably large amounts of ammonia instead of nitrogen when the reducing agent is hydrogen. Others promote the formation of undesirably large amounts of intermediate oxidation products in the oxidation of hydrocarbons instead of promoting complete oxidation to carbon dioxide and water. Other catalysts, including the platinum metals and some of the transition and rare earth metal oxides, lose their catalytic activity upon exposure to alternate oxidizing and reducing environments from industrial processes and internal combustion engines operating under frequently changing conditions.

Still other proposed catalysts have reduced catalytic activity after exposure to normally non-reactive components of gas mixtures. For example, the transition and rare earth metal oxides have reduced activity as catalysts for the oxidation of carbon monoxide and hydrocarbons in the presence of water. Platinum metal catalysts lose their catalytic activity upon exposure to internal combustion engine exhaust gases containing compounds of lead, sulfur, phosphorus, chlorine and other materials derived from additives conventionally employed in automotive fuels and lubricants. Thus, there is a need for stable catalysts which are low in cost, simple to prepare, and selective in promoting desired oxidation-reduction reactions at relatively low temperatures.

SUMMARY OF THE INVENTION

The present invention comprises catalytic compositions having perovskite-type, $ABO_3$, crystal structures wherein the A sites are substantially fully occupied by barium ions; the Type B cation sites are occupied by ions of at least one platinum group metal selected from ruthenium, osmium, rhodium, iridium, palladium and platinum, wherein one of the platinum group metals present is ruthenium which occupies up to about 10% of the Type B cation sites, with the total platinum group metal ions occupying about 1% to 20% of the Type B cation sites; the remainder of the Type B cation sites are occupied by ions of at least one nonplatinum group metal having an ionic radius between 0.4 to 1.4 Angstroms.

The preferred compositions of this invention have the formula $$Ba[Ru_x B_y^1 B_z^2]O_3$$

wherein
  $B^1$ is selected from cations of at least one of the platinum group metals rhodium, palladium, osmium, iridium and platinum,
  $B^2$ is selected from cations of at least one non-platinum metal having ionic radii of about 0.4 to 1.4 Angstroms,
  x is 0.001 to 0.10,
  y is 0 to 0.199,
  x+y is 0.01 to 0.2,
  z is 0.8 to 0.99, and
  x+y+z is substantially 1.

Most preferably, x in the above formula is about 0.005 to 0.1 (0.5% to 10% Ru). Another important facet of this invention is the interrelationship of ruthenium with one or more other platinum group metals. In fact, compositions containing at least two platinum group metals, one of which is ruthenium, represent especially preferred embodiments of this invention.

Typical compositions containing two platinum group metals are those wherein the sum of x and y is about 0.01 to 0.2 (1% to 20% of the B sites). In such compositions, ruthenium can be present in more than 10% of the B sites. Combinations containing two platinum group metals include ruthenium with platinum, ruthenium with palladium, ruthenium with rhodium, and ruthenium with platinum and palladium. A mixture of platinum group metals obtained by the partial refining of their ores is also useful. The most preferred combination is ruthenium with platinum, such combination providing outstanding catalytic activity in the reduction of oxides of nitrogen and in the oxidation of carbon monoxide and hydrocarbons.

Although the platinum group metals are capable of occupying more than 20% of the B cation sites in the perovskite crystal structure, little, if any, additional catalytic benefit is achieved thereby. Since the platinum group metals are scarce and expensive, it is highly desirable that the catalytic compositions contain as little of these metals as is consistent with desired catalytic activity. It is an important characteristic of the present invention compositions that high catalytic activities are obtained with compositions containing relatively low levels of platinum group metals.

The compositions of this invention are characterized most especially by their effectiveness in catalyzing the reduction of nitrogen oxides. They are characterized also in their overall effectiveness at relatively low levels of only about 10% of a platinum group metal.

DETAILS OF THE INVENTION

The catalytic compositions of this invention contain substantially only barium ions in the A cation sites and at least two metals in the B cation sites. The total number of cations are the same in the A sites as in the B sites; the combined charge of the A and B site cations being substantially equal to the charge on the oxygen atoms.

The ideal perovskite structure is one which contains cations of appropriate relative sizes and coordination properties, as well as cubic crystalline forms in which the corners of the unit cubes are occupied by the larger A site cations (each coordinated with twelve oxygen atoms), the centers of the cubes are occupied by the smaller B site cations (each coordinated with six oxygen atoms), and the faces of the cubes are occupied by oxygen atoms. Many variations and distortions of this fundamental cubic crystal structure are known among materials commonly considered to be perovskites or perovskite-like. Among the terms which have been used to described variations of the cubic crystal structure of perovskite and perovskite-like metal oxides are rhombohedral, orthorhombic, pseudo-cubic, tetragonal, and pseudotetragonal.

The importance of ionic radii in perovskite crystal structures has been discussed by many authors, e.g., by Krebs in "Fundamentals of Inorganic Crystal Chemistry", McGraw Hill, London (1968). Assuming that the crystal structure is formed by the packing of spherical ions, there can be derived the relationship $$R_A + R_O = t\sqrt{2}(R_B + R_O)$$

in which $R_A$, $R_B$, and $R_O$ are the ionic radii of the A site metal, the B site metal, and the oxygen ions, respectively, and t is a tolerance factor. Tetragonal pervoskite crystal structures are usually obtained in simple ternary compounds when t is between about 0.9 and 1.0. Distorted perovskite-type structures usually result when t is between about 0.8 and 0.9. Perovskite-type structures can be obtained with wider departures from this idealized picture in the more complex compounds of the present invention, particularly when these compounds contain small proportions of ions having radii larger or smaller than would be accommodated with the tolerance factor t between 0.8 and 1.0. Ionic radii have been tabulated by Shannon and Prewitt in Acta. Cryst. B26 1046 (1970); B25 925 (1969).

In the perovskite-type B cation sites, palladium is typically divalent, rhodium is typically trivalent, ruthenium, iridium, and platinum are typically tetravalent, and osmium can have a valence of four, five, six, or seven.

About 0.8 (80%) to 0.99 (99%) of the B sites are occupied by cations of one or more nonplatinum metals having ionic radii from 0.4 to 1.4 Angstroms, each being present in an amount and with a valence consistent with the described perovskite compositions. Thus, B site cations can have valences of one to seven and can be from the Periodic Table groups 1A, 1B, 2A, 2B, 3A, 3B, 4A, 4B, 5A, 5B, 6B, 7B, 8, or from the lanthanide or actinide series. While certain metals in these groups may have several commonly recognized valence states, it will be appreciated that not all of the valence states are present in the perovskite crystal structures because of limitations such as the ionic radius and coordination properties of the metal ion. On the other hand, those metal ions with valences which are not commonly associated with the metals because of instability, etc., in aqueous solutions can exist in the perovskite crystal structures because of the stabilizing properties conferred by the perovskite crystal structures.

The nonplatinum metals for the B site having valence one can be from groups 1A and 1B. Preferably, they are sodium, silver, or copper. The nonplatinum B site metals having valence two can be from groups 1B, 2A, 2B, 3B, 6B, 7B, and 8. Preferably, they are magnesium, calcium, strontium, chromium, manganese, iron, cobalt, nickel, or copper. The nonplatinum B site metals having valence three can be from groups 3A, 3B, 4B, 5A, 5B, 6B, 7B, 8 and the lanthanide and actinide rare earth metals. Preferably, they are lanthanum, a lanthanide rare earth metal, aluminum, titanium, vanadium, chromium, manganese, iron, cobalt, or nickel. The nonplatinum B sites metals having valence four can be from groups 4A, 4B, 5B, 6B, 7B and 8. Preferably, they are titanium, vanadium, chromium, manganese, iron, cobalt, nickel, or rhenium. The nonplatinum B site metals having valence five can be from groups 5A, 5B, 6B and 7B. Preferably, they are selected from antimony, niobium, tantalum, vanadium and rhenium. The nonplatinum B site metals having valence six are preferably tungsten and molybdenum, and the nonplatinum metal having a valence of seven is preferably rhenium.

The preferred nonplatinum B site metals noted above have one or more of the following desirable characteristics: (1) proper ionic size, with correspondingly increased ease of formation and greater stability of perovskite crystal structures; (2) capability of existing in perovskite crystal structures in which they are in more than one valence; (3) generally high catalytic activity and/or selectivity in metal oxide compounds; (4) abundance and corresponding relatively low cost; and (5) stability in perovskite crystal structures.

Certain compounds of this invention contain nonplatinum B site metals which, although ordinarily known to be capable of existing in several valences, nevertheless are known to be present in perovskite crystal structures in only one of the several possible valences. Such compounds have a major proportion of at least about 50% and preferably 75% or more of nonplatinum B site metals which are known in perovskite crystal structures primarily or only in one valence. The metals of this group are:

valence 1: lithium, sodium, silver;
valence 2: magnesium, calcium, strontium, barium, zinc, cadmium;
valence 3: aluminum, gallium, indium, thallium, lanthanum, yttrium, and neodymium;
valence 4: zirconium, hafnium, thorium, germanium, tin;
valence 5: antimony, tantalum;
valence 6: tungsten.

Preferably, the nonplatinum metals of this class are sodium, magnesium, calcium, strontium, tin, or antimony. These relatively abundant metals can be present in the compounds of this embodiment in major proportions with relatively small reductions in the catalytic activity contributed to these compounds by other less readily available metals and therefore represent relatively inexpensive diluents in such compounds. More preferably, the compounds contain a valence three metal and especially aluminum as the principal non-platinum metal. Aluminum is not only an inexpensive diluent but also imparts to perovskite crystal structures a high degree of thermal stability and durability in catalytic applications.

Another embodiment of this invention comprises compositions wherein a major proportion of at least 50% and preferably more than 75% of the nonplatinum B site metals are those metals whose metals ions are ordinarily known to be capable of existing in several valences and are also known to be present in the perovskite structures in several valence states, that is, are known in a first valence in one perovskite and in a second valence in a second perovskite compound. Such metals known in perovskite crystal structures in two valences differing in increments of one or two valence units are:

valences 1 and 2: copper;
valences 2 and 3: scandium, samarium, ytterbium;
valences 2 and 4: lead;
valences 2, 3, and 4: chromium, manganese, iron, cobalt, nickel, and cerium;
valences 3 and 4: titanium, praseodymium;
valences 3, 4, and 5: vanadium;
valences 3 and 5: bismuth, niobium;
valences 4 and 6: molybdenum;
valences 4, 5 and 6: rhenium and uranium.

The compositions of this embodiment can contain one and preferably two or more such variable-valence nonplatinum metals, particularly those transition metals which have atomic numbers between 22 and 29 inclusive, that is, titanium, vanadium, chromium, manganese, iron, cobalt, nickel, and copper. Particularly preferred are iron, cobalt, and nickel. These metals are readily available and compounds containing them are capable of existing in perovskite crystal structures in two or three valences differing by increments of one valence unit. In one preferred embodiment of this invention the nonplatinum type B metals are such metals each in a single valence.

Those compositions in which at least one nonplatinum B site metal is present in two valences constitute another preferred embodiment of this invention. Such metal oxides have increased activity as catalysts over similar compounds in which each of the component metals is present in only a single valence, possibly because of the enhanced electron mobility through their crystal structures resulting from the presence of a variable-valence metal when at least 5% of the nonplatinum B sites are occupied by a variable-valence metal in a first valence and at least 5% of the nonplatinum B sites are occupied by the same metal in a second valence. The valences preferably differ by one unit but will differ by two units with some metals, such as lead and niobium.

The compositions which contain a single A site metal and at least one metal ion in the B site which can be in perovskite crystal structures in two or more valences permits easy adjustment of the valence balance of the compound. The amounts of differing valence forms of a compound can be adjusted so that the total valence charge of the metals equals the total valence charge of the oxygen present.

Similarly, variable valence metals permit the formation of the perovskite crystal structure when deficiencies of up to about 25% of a metal or oxygen might prevent the precise $ABO_3$ stoichiometric ratio.

The compositions of this invention can be prepared by heating mixtures of metal oxides, hydroxides, metals, and/or metal salts for sufficient times at temperatures which permit spontaneous formation of the compounds. The mixture of materials are preferably finely subdivided and intimately mixed before heating and are thoroughly ground and mixed by any conventional technique several times during the heating period. The mixture is reground and remixed because the compounds are in many instances formed by atomic diffusion, without melting of any of the starting or potential intermediate materials, and are otherwise subject to coating of unreacted particles by reaction products. The heating times and temperatures required for the formation of significant amounts of these catalytic compounds depend upon the particular compositions being formed, the required times usually being shorter at higher temperatures. Temperatures above about 900° C. are usually suitable for the formation of these compounds, using firing times of hours to days with occasional intermediate grinding and mixing, but temperatures of 1000° to 1500° C. can also be used.

In forming the compounds of this invention, stoichiometric mixtures of starting materials are preferably heated in air or other oxygen-containing gas.

The starting materials used in preparing the compounds of this invention by anhydrous processes can be any salts which are converted to oxides by prolonged heating in oxidizing atmospheres at the temperatures at which these compositions are formed. For example, they can be carbonates, salts of carboxylic acids such as acetates, oxalates and tartrates; salts of the acids of sulfur such as sulfides, sulfites and sulfates; halogen acid salts which are converted to oxides without volatilization such as ruthenium chloride, strontium chlorate and barium perchlorate; and salts of the acids of nitrogen such as nitrates and nitrites. Preferably they are carbonates, nitrates or sulfates. The presence of small amounts of salts of other such acids in a mixture which is predominantly oxides or carbonates is usually not significantly deleterious since such salts are converted into oxides during heating to prepare these catalytic compositions.

The compounds of this invention are presumed to function as catalysts primarily at their surfaces, so compositions with significant surface areas are preferred. The surface areas of compounds prepared by heating mixtures of materials can be increased by grinding and other conventional methods. Catalytically active compounds with surface areas between about 0.1 and 10 square meters per gram (determined by the well-known Brunauer-Emmett-Teller method) can be obtained. Compounds with surface areas greater than about one square meter per gram are preferred. The surface area of these compounds remains relatively unchanged during use by virtue of their compositional and structural stability at high temperatures.

The compounds described herein can be used as catalysts in the form of free-flowing powders, for instance in fluid-bed reaction systems, or in the form of shaped structures providing efficient contact between the catalyst and the reactant gases. Such catalyst structures can contain minor (e.g., less than about 50%) or major (e.g., more than about 50% to about 98%) amounts of catalytically inert materials. These inert materials can be either porous or solid, with the catalytic compounds primarily on the surfaces thereof or more or less uniformly dispersed throughout. For example, the powdered compounds can be formed into porous catalyst pellets in which they are dispersed throughout by conventional techniques employing pellet presses, rolling mixers, extruders, etc. Preferably such pellets contain suitable dispersants, lubricants, and/or binders.

One particularly useful dispersant-binder for forming extruded pellet catalyst structures containing the catalyst compositions described herein is a high-purity alpha alumina monohydrate sold by the Continental Oil Co. as "Dispal". This material is a white, free-flowing powder of small particle size formed of very fine ultimate crystallites having a surface area of about 200 square meters per gram and a bulk density of 45 to 50 pounds per cubic foot. It forms thixotropic dispersions at concentrations of about 3% to 30% in water containing about 4% to 6% commercial concentrated (37% HCl) hydrochloric acid based on the weight of alumina, which dispersions become thicker upon standing. Thick dispersions containing about 20 to 30 parts of the alumina monohydrate and about 100 to 150 parts of acidified water per 100 parts of a catalytic composition having a surface area of about two square meters per gram can be extruded through small orifices to obtain structures which retain their form when wet and have significant strength when dried of gross water and heated at about 500° C. to about 900° C. to remove at least a part of the water present in the alumina monohydrate.

The compounds of this invention are preferably employed as catalysts in the form of coatings on suitable refractory supports. Such supports can be in any convenient shape, including powders, granules, spheres, rings, tablets, pills, bars, tubes, extruded shapes, rolls, spirals, screens, beads, coils, and the more elaborate shapes (e.g., corrugated and flat sheets, honeycombs, etc.) prepared by a variety of methods and recently available to the art.

Suitable supports can be composed solely or primarily of silica, of ceramic compositions having softening or melting temperatures above the temperatures involved in forming or coating these catalytic compositions on such supports, of natural silicious materials such as diatomaceous earths and pumice, as well as of alundum, gamma alumina, silicon carbide, titania, zirconia, and other such refractory materials.

A particularly useful refractory support is an alumina ceramic described in U.S. Pat. Nos. 3,255,027; 3,338,995 and 3,397,154. Such materials can be made by coating an aluminum foil fabricated into a shaped structure having the desired final configuration with a fluxing agent and firing to convert the aluminum into substantially pure alpha alumina. Suitable fluxing agents include alkali and alkaline earth metal oxides and compounds which yield such oxides on firing (e.g., sodium silicate) which serve to prevent inhibition of oxidation of the aluminum due to oxide scum formation on the surface of the aluminum. One such alumina contains, for example, small amounts of magnesium aluminate and aluminum silicate.

As disclosed in the patents mentioned above, honeycomb structures can be made by placing flux-coated corrugate sheets of aluminum together node-to-node and firing. Similar structures can be obtained by applying a composition containing aluminum powder, a binder, a fluxing agent, and a liquid carrier to a corrugated paper honeycomb structure and firing in an oxidizing atmosphere to burn out the paper structure and oxidize the aluminum to alumina. Honeycomb structures of such alumina compositions are available from E. I. du Pont de Nemours & Company, under the trade name "Torvex". The preferred structures have nominal cell sizes 1/16 to ¼ inch.

The compounds can be applied to suitable supports in several ways. For example, they can be formed upon supports which are sufficiently high melting and nonreactive by soaking the support structure in a solution of a suitable mixture of salts, drying, and firing the impregnated support to a temperature and for a time sufficient to form the catalytic structure. Alternately, the compounds can be preformed and applied to the support structure in a slurry which can optionally contain diluent materials which can also be catalytic materials. A particularly useful dispersant-binder for use in such slurry-coating processes is the "Dispal" alpha alumina monohydrate described hereinabove as a dispersant-binder useful in making extruded catalyst structures. Typically, acidified dispersions containing about 4% to 10% alpha alumina hydrate and a comparable amount of the ground catalytic composition are prepared, pieces of the support material are coated with the dispersion, the coated pieces are dried, and the dried coated pieces are heated to a temperature and for a time (e.g., for 2 to 24 hours at 500° C. to 900° C.) to remove at least a portion of the water from the alpha alumina monohydrate. Other support materials and techniques for applying catalytic materials to supports, useful and effective with the compounds of this invention, are described in U.S. Pat. No. 3,518,206 and U.S. Pat. No. 3,554,929.

The metal oxides of the present invention are stable and durable at high temperatures and have been shown to catalyze the oxidation of hydrocarbons and carbon monoxide and also the reaction between nitrogen oxide ($NO_x$) and carbon monoxide to give nitrogen and carbon dioxide. They are not poisoned by the lead compounds present in the exhaust of internal combustion engines operated on leaded gasoline. Accordingly, an important use of the catalysts of this invention is the removal of noxious components from the exhaust of internal combustion engines. For this purpose the catalysts are preferably supported on shaped alumina supports, although other supports inert to the exhaust gas at the operating temperature may be used.

As formed by heating and grinding, the compounds of the present invention are obtained in the form of a crystalline powder. Particularly effective and durable catalysts for use in treating the exhaust gases of internal combustion engines operating with leaded fuels are obtained when this powder is supported on an alumina support, preferably the honeycomb-structured alumina supports sold under the trade name "Torvex" described hereinabove. The catalyst powder should be applied to the surface, together with a binder to affix the same to the support, in an amount sufficient to coat the entire surface, usually in an amount of from 2 to 25% by weight of the support.

The catalytic compounds of the present invention may be employed to catalyze other reactions similar to the reactions occurring in the purification of internal combustion engine exhausts. For such applications, where lead compounds are absent, a wider variety of support materials may be employed such as pellets or other shaped structures of mullite, cordierite and silica.

This invention is further illustrated by the following Examples.

EXAMPLES 1 and 2

In Examples 1 and 2, pervoskites were prepared having the following nominal compositions:

| Example | Composition |
|---|---|
| 1. | $[Ba][Co_{0.6}Nb_{0.3}Ru_{0.1}]O_3$ |
| 2. | $[Ba][Ti_{0.9}Ru_{0.1}]O_3$ |

The oxides were prepared by mixing the ingredients listed in Table I, grinding until homogeneous, and heating the mixtures in procelain crucibles in air in a muffle furnace for the number of days and at the temperatures given in Table I with occasional regrinding and remixing. Each of the resulting compositions was finally ground and passed through a 325-mesh Tyler standard sieve screen. The X-ray diffraction patterns of these metal oxides were consistent with the expected perovskite structure, and showed substantially complete incorporation of the starting materials into the crystal structure.

The pattern for the compound of Example 1 showed no evidence of binary metal oxides. The pattern for the compound of Example 2 was similar to that of the perovskite, $BaTiO_3$, with no evidence of the presence of binary metal oxides. The pattern was consistent with the disclosures of Dickson (Dickinson), Katz, and Ward in the Journal of the Americal Chemical Society, Volume 83, pages 3026–3029 (1961) pertaining to the perovskite, $[Ba][Ti_{0.67}Ru_{0.33}]O_3$.

The catalytic compositions were applied to supports for testing of their performance characteristics. One part of "Dispal" M alumina dispersant and binder (obtained from the Continental Oil Co.) was mixed with 17 parts of water containing a few drops of commercial concentrated hydrochloric acid. To separate portions of such mixtures was added 7.5 parts of each of the catalytic compositions of Examples 1 to 3 to obtain a stable thixotropic slurry. Cylinders of "Torvex" alumina ceramic honeycomb with straight-through cells (obtained from E. I. du Pont de Nemours & Co.) were soaked in water. These cylinders weighed about 6 grams, were about 2.5 centimeters in diameter and thickness and nominally had a cell size of 1/16 inch, wall thickness of 0.018 inch, open area of 50%, 253 hexagonal holes per square inch, and a nominal geometric surface area of 462 square feet per cubic foot. The water-soaked cylinders were dipped into the slurries of the catalytic compositions, the gross excess of slurry was removed by blowing the cylinders with air, the cylinders were dried and heated for about 30 minutes in a muffle furnace at 650° to 900° C. The cooled supports were again dipped into the slurries, blown free of gross slurry, and dried and then heated for two hours or more in the muffle furnace at 650° to 900° C. The percentage increases in weight of the supports due to the adherent catalytic compositions and binder are given in Table I.

TABLE I

| Preparation of Compositions | | |
|---|---|---|
| Example | 1 | 2 |
| Ingredients | | |
| Barium carbonate, $BaCO_3$ | 20.00 | 20.00 |
| Titanium dioxide, $TiO_2$ | — | 7.29 |
| Cobalt carbonate, $CoCO_3$ | 7.26 | — |
| Niobium pentoxide, $Nb_2O_5$ | 3.99 | — |
| Ruthenium oxide, $RuO_2 \cdot xH_2O$ (43.5% Ru) | 2.32 | 2.35 |

TABLE I-continued

| Preparation of Compositions | | |
|---|---|---|
| Example | 1 | 2 |
| Days heated in furnace | 4 | 4 |
| Furnace temperature, °C. | 1000 | 1000 |
| Percent composition and binder on support | 14.2 | 12.6 |

The catalytic activity of the compounds in the reduction of nitric oxide by carbon monoxide was tested. The "Torvex" ceramic honeycomb cylinders coated with the catalytic compositions and binder were separately installed in a stainless steel chamber with a nominal internal diameter of 2.5 centimeters, height of 2.5 centimeters, and volume of 12.3 cubic centimeters. Nitrogen containing about 2000 parts per million of nitric oxide and about 10,000 parts per million of carbon monoxide was passed through the chamber at a nominal hourly space velocity of about 40,000 $hr^{-1}$ and pressure of one pound per square inch gauge while the feed gas and the catalytic chamber were heated so that the temperature of the gas entering the catalyst chamber increased from about 60° C. to 600° C. over about 90 minutes.

Samples of the inlet and exit gases were obtained periodically. The nitric oxide in these samples was oxidized to nitrogen dioxide. The resulting gas mixture was analyzed and the percent reduction in the nitric oxide concentration of the gas upon passing through the catalyst chamber was calculated. A smooth plot was made of the degree of conversion of nitric oxide at different catalyst chamber inlet temperatures for each catalytic composition. From a smooth curve through each plot, temperatures were estimated for "light-off" (the intercept with the temperature axis of an extrapolation of the portion of the curve at which the degree of conversion changed rapidly with temperature) and for nitric oxide conversions of 25%, 50%, and 90%. The catalyst temperature was higher than the catalyst bed inlet temperature with all the catalytic compositions at nitric oxide conversions greater than about 25%. Table II gives the estimated temperatures for "light-off" and for 25%, 50%, and 90% conversion of nitric oxide before and after heating the catalyst-coated honeycomb cylinders for 100 hours at about 900° C.

The catalytic activity of the above-described "Torvex" cylinders coated with catalytic compositions and binder in the oxidation of carbon monoxide was determined in a similar apparatus and by a similar procedure. Nitrogen containing about 10,000 parts per million of carbon monoxide and 10,000 parts per million of oxygen was passed through the catalyst chamber and the entering and exiting gas mixtures were analyzed chromatographically using a column containing granules of "Linde" 13X molecular sieve. The estimated temperatures for "light-off" and for 25%, 50%, and 90% conversion of carbon monoxide before and after heating the catalyst-coated honeycomb cylinders for 100 hours at about 900° C. are given in Table II.

The catalytic activity of the above-described "Torvex" cylinders coated with catalytic compositions in the oxidation of propane was determined in a similar apparatus and by a similar procedure. Nitrogen containing about 1300 parts per million of propane and 8800 parts per million of oxygen was passed through the catalyst chamber and the entering and exiting gases were analyzed chromatographically using a column containing 80 to 100 mesh "Poropak" Q. The temperatures for "light-off" and for 25%, 50%, and 90% conversion of propane before and after heating the catalyst-coated honeycomb cylinders for 100 hours at about 900° C. are given in Table II.

TABLE II

Catalytic Activity of Compositions of This Invention

| Example | 1 | | 2 | |
|---|---|---|---|---|
| Hours at 900° C.: | 0 | 100 | 0 | 100 |
| Reduction of Nitric Oxide | | | | |
| "Light-off" temp., °C. | 295 | 290 | 280 | 280 |
| 25% conversion, °C. | 325 | 325 | 320 | 335 |
| 50% conversion, °C. | 350 | 355 | 345 | 385 |
| 90% conversion, °C. | 390 | 425 | 390 | 495 |
| Oxidation of Carbon Monoxide | | | | |
| "Light-off" temp., °C. | 230 | 325 | 290 | 280 |
| 25% conversion, °C. | 270 | 385 | 325 | 315 |
| 50% conversion, °C. | 310 | 450 | 340 | 340 |
| 90% conversion, °C. | 450 | 565 | 545 | 460 |
| Oxidation of Propane | | | | |
| "Light-off" temp., °C. | 315 | 325 | 410 | 535 |
| 25% conversion, °C. | 450 | — | — | — |
| 50% conversion, °C. | 560 | — | — | — |
| 90% conversion, °C. | — | — | — | — |

Using the general procedure described above for preparing the compositions of Examples 1 and 2, other compositions of the invention can be quite easily prepared. Appropriate nonplatinum metals can be employed together with or in place of any or all of the cobalt, niobium and titanium used to make the compositions of Examples 1 and 2. Likewise, platinum group metals other than ruthenium can be combined with ruthenium to prepare compositions having the parameters described herein in connection with such platinum group metals.

Nonplatinum reactants can include, for example: vanadium pentoxide, manganese carbonate, chromium trioxide, nickel oxide, molybdenum oxide, tantalum pentoxide, tungsten oxide, iron oxide, copper nitrate, etc. Platinum group metal reactants can include: rhodium oxide, palladium oxide, iridium oxide, platinum oxide, etc. Reactant amounts, of course, depend on the desired composition and upon the desired atomic fraction of each constituent.

Employing the procedures and details described herein, one can easily prepare composition having the following platinum group metal combinations:

| Platinum Group Metal | Atomic Fraction | | | | | | | |
|---|---|---|---|---|---|---|---|---|
| ruthenium | 0.005 | 0.005 | 0.01 | 0.01 | 0.05 | 0.05 | 0.1 | 0.1 |
| platinum | 0.005 | | | | | 0.05 | 0.1 | |
| rhodium | | 0.005 | | | | 0.05 | 0.1 | |
| iridium | | | 0.01 | | 0.05 | | | |
| palladium | | | | 0.19 | | 0.05 | | |

| Platinum Group Metal | Atomic Fraction | |
|---|---|---|
| osmium | 0.001 | 0.05 |

The embodiments of the invention in which an exclusive property or privilege is claimed are defined as follows:

1. A catalytic composition having the perovskite-type, ABO$_3$, crystal structure wherein the Type A cation sites are substantially fully occupied by ions of barium; the Type B cation sites are occupied by ions of at least two platinum group metals selected from ruthenium and at least one of osmium, rhodium, iridium, palladium and platinum, wherein ruthenium occupies up to about 10% of the Type B cation sites, with the total platinum group metal ions occupying about 1% to 20% of the Type B cation sites; the remainder of the Type B cation sites are occupied by ions of at least one nonplatinum group metal having an ionic radius between 0.4 to 1.4 Angstroms.

2. A composition according to claim 1, having the formula $$Ba[Ru_xB_y{}^1B_z{}^2]O_3$$

wherein

B$^1$ is selected from cations of at least one of the platinum group metals rhodium, palladium, osmium, iridium and platinum, B$^2$ is selected from cations of at least one nonplatinum metal having ionic radii of about 0.4 to 1.4 Angstroms, x is 0.001 to 0.10, y is up to 0.199, x+y is 0.01 to 0.2, z is 0.8 to 0.99, and x+y+z is substantially 1.

3. A composition according to claim 2, wherein x is 0.005 to 0.1.

4. A composition according to claim 1, wherein the platinum group metals are ruthenium and platinum.

5. A composition according to claim 1, wherein the platinum group metals are ruthenium and palladium.

6. A composition according to claim 1, wherein the platinum group metals are ruthenium and rhodium.

7. A composition according to claim 1, wherein the platinum group metals are ruthenium, platinum and palladium.

8. A composition according to claim 1, wherein the platinum group metals are ruthenium, rhodium and platinum.

9. A composition according to claim 1, wherein the nonplatinum B site metal is selected from at least one of cobalt, niobium and titanium.

10. A composition having the nominal formula:

$$Ba[Co_{0.6}Nb_{0.3}Ru_{0.1}]O_3.$$

* * * * *